United States Patent [19]

Corsi

[11] Patent Number: 5,394,604
[45] Date of Patent: Mar. 7, 1995

[54] AUTOMATIC OPEN-STRUCTURE MACHINE TOOL CONVERTIBLE INTO A CLOSED-STRUCTURE MACHINE TOOL SUCH AS A GANTRY MACHINE

[75] Inventor: Armando Corsi, Piacenza, Italy

[73] Assignee: Jobs S.p.A., Piacenza, Italy

[21] Appl. No.: 173,901

[22] Filed: Dec. 27, 1993

[30] Foreign Application Priority Data

Feb. 12, 1993 [IT] Italy .................. PC93A0005

[51] Int. Cl.6 ............................................. B23Q 1/28
[52] U.S. Cl. ...................................... 29/560; 408/234; 409/202; 409/235
[58] Field of Search ............... 29/560; 409/202, 212, 409/235, 236; 408/234

[56] References Cited

U.S. PATENT DOCUMENTS

| | | | |
|---|---|---|---|
| 1,908,478 | 5/1933 | Eisele | 409/236 |
| 3,137,207 | 6/1964 | Berthiez | 408/234 X |
| 3,154,979 | 11/1964 | Crispin | 408/234 X |

*Primary Examiner*—Z. R. Bilinsky
*Attorney, Agent, or Firm*—Notaro & Michalos

[57] ABSTRACT

An automatic open-structure machine tool has an upright (3) which moves along a track (2) (axis X) fixed to a base (1), the upright being integral with a projecting crosspiece (4) along which moves (axis Y) the support (5) of a sleeve (6) which moves along an axis orthogonal to the preceding ones (axis Z). An additional structure (8) designed to be located at the open side of the machine tool is, fitted with a connector system (9) which slides along the structure, such connector system being designed for connection to the free end of the crosspiece, so as to make the open-structure into a gantry machine.

8 Claims, 7 Drawing Sheets

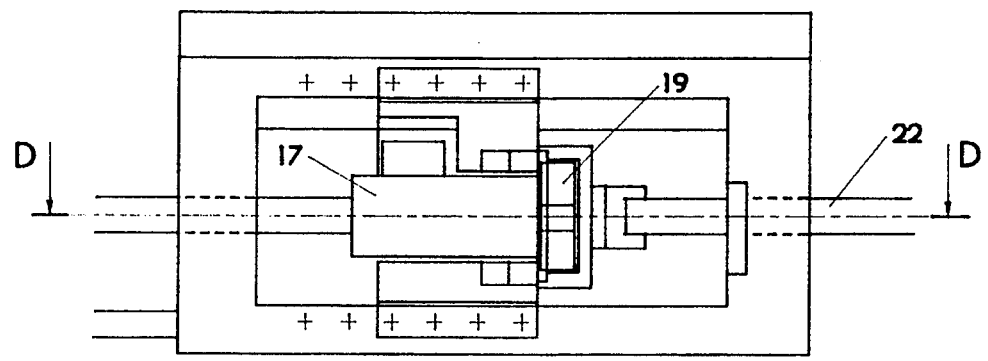
FIG. 5
FIG. 6
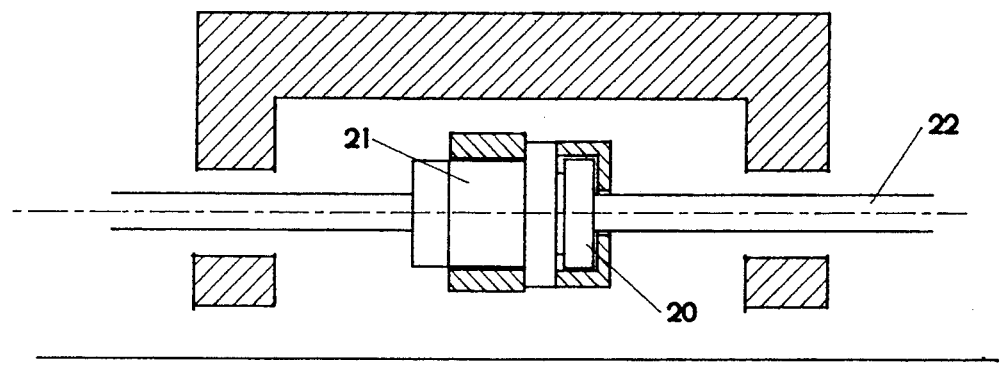

AUTOMATIC OPEN-STRUCTURE MACHINE TOOL CONVERTIBLE INTO A CLOSED-STRUCTURE MACHINE TOOL SUCH AS A GANTRY MACHINE

FIELD AND BACKGROUND OF THE INVENTION

This invention relates to an automatic open-structure machine tool which can be converted into a closed-structure machine tool such as a gantry machine or a mobile-crosspiece machine, following which the original configuration can be restored when required.

This is a machine of the type comprising a track along which runs an upright with a projecting crosspiece (axis X); a support which houses a sleeve runs along the crosspiece (axis Y), and an operating head is fixed to the sleeve, which moves along a vertical axis orthogonal to the previous ones (axis Z).

The machine is designed so that a connector with sliding shoes can be fitted to the end of the mobile crosspiece, together with an auxiliary motor (if required), to connect that end of the crosspiece to a structure, also forming part of the invention, which consists of a monolithic truss with a guide along which the said connector fixed to the crosspiece runs.

As part of the invention, a seating is cut into the upright of the mobile structure for the insertion of suitable counterweights designed to balance the weight of the projecting parts, in order to limit the deformation of the structure when the machine is used in the open configuration.

An open-structure machine is known from the application no. PC91 U 000002 dated 21st January 1991 filed by the same applicant; a side view of that machine is shown in FIG. 1.

That machine comprises a base 1 with a pair of guides 2 along which moves a structure comprising an upright 3 with a projecting crosspiece; along the said crosspiece runs support 5 of a sleeve 6 which is fitted with an operating head with several degrees of freedom equipped with an electric chuck with connector for an interchangeable tool.

This describes the state of the art to date.

At times, however, situations arise in which it would be useful to have a machine with a closed structure, such as a mobile-crosspiece machine, ie. one with a crosspiece which moves along a pair of rails and supports the tool-holding sleeve, or a gantry machine in which a gantry structure moves along a pair of rails and always supports a sleeve with the operating head.

Many companies require an open-structure machine for most applications, but in some cases would find it useful to have a closed-structure machine tool, although this need is not so frequent as to justify the cost of purchasing a second machine.

SUMMARY OF THE INVENTION

In order to solve this problem, this invention offers an automatic open-structure machine tool which can be converted into a closed-structure machine tool such as a gantry machine by fitting a connector to the free end of the crosspiece and positioning a monolithic structure with a guide cut into it, along which runs the said connector fitted to the crosspiece; the connector may or may not be equipped with an independent motor.

BRIEF DESCRIPTION OF THE DRAWINGS

This invention will now be described in detail, by way of example but not of limitation, by reference to the annexed figures, in which:

FIG. 5 is a top view of the detail shown in FIG. 4

FIG. 6 is a cross-section along line B—B shown in FIG. 7

DESCRIPTION OF THE PREFERRED EMBODIMENT

Figure 1:
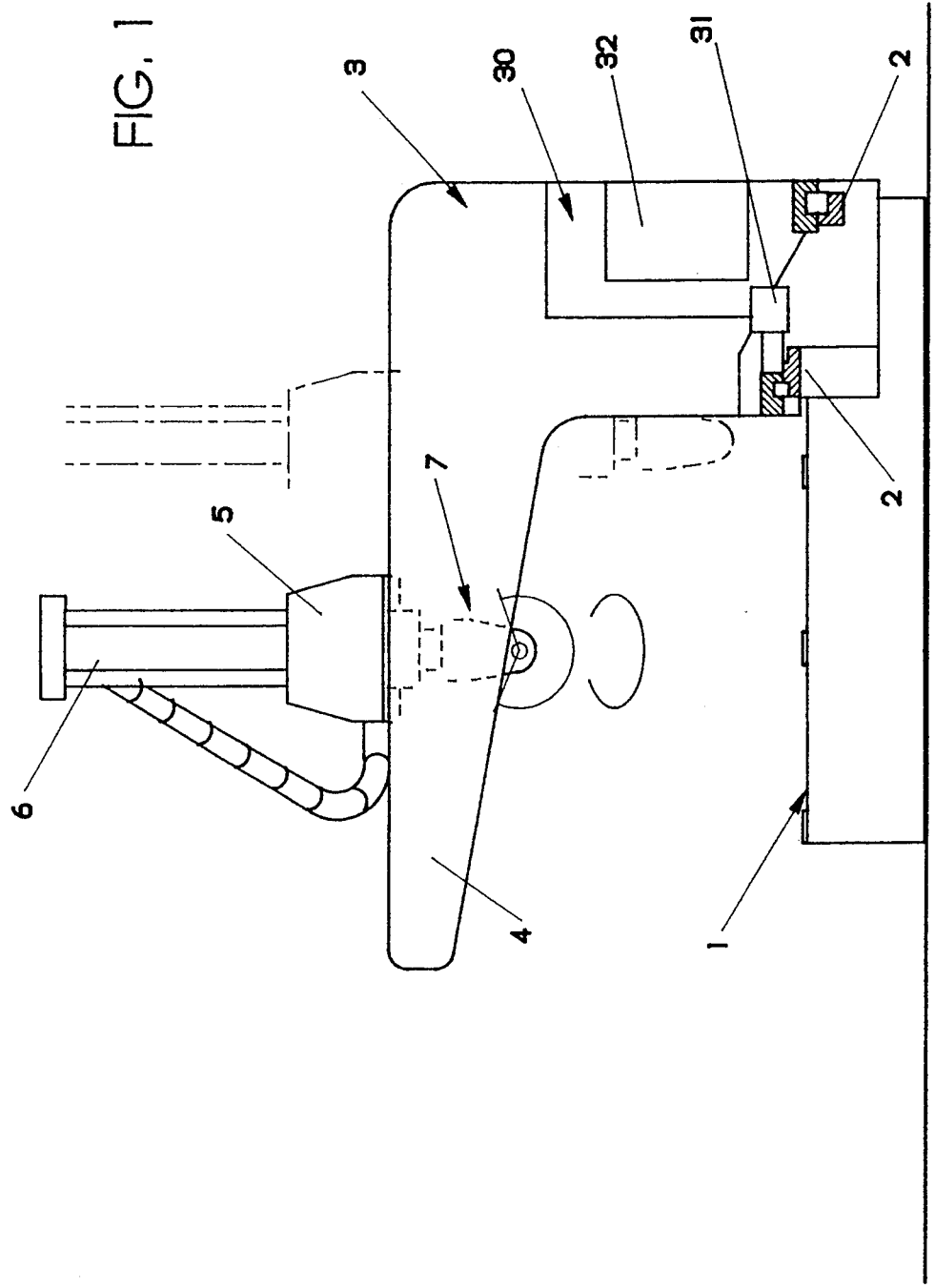
FIG. 1 schematically illustrates the side view of an open-structure machine in accordance with the invention

With reference to FIG. 1, the machine in accordance with the invention comprises a base 1 on which the workpiece rests; this base presents a pair of guides 2 along which a structure comprising an upright 3 and a projecting crosspiece 4 moves (axis X).

A support 5 of a sleeve 6 runs along crosspiece 4 (axis Y); the sleeve is fitted with an operating head 7 with several degrees of freedom, which is equipped with an electric chuck with a tool connector (axis Z).

Figure 2:
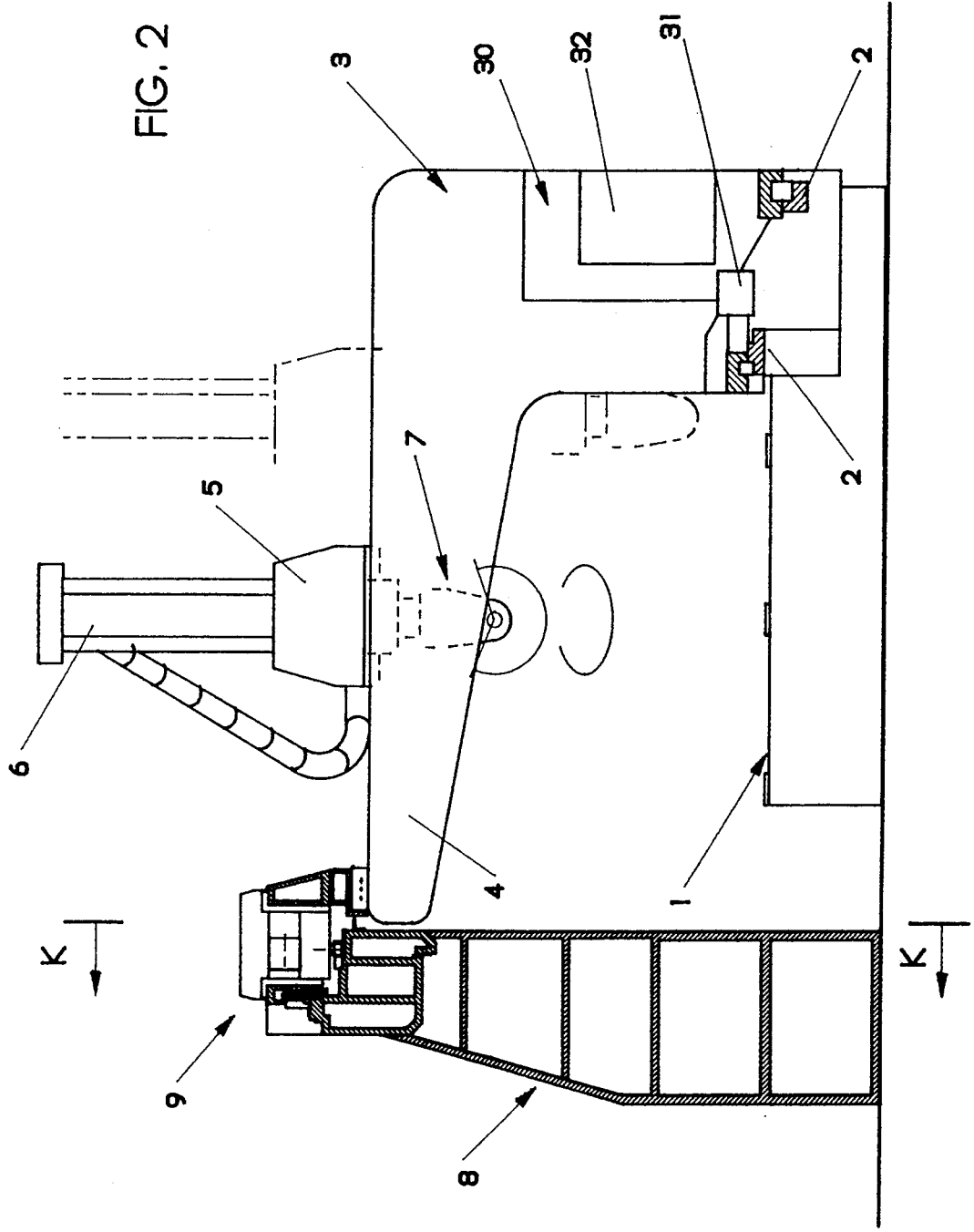
FIG. 2 shows the machine converted from an open to a closed structure, with a partial cross-section of the structure added to allow use as a closed-structure machine

The sleeve moves vertically in relation to support 5. With reference to FIG. 2, in order to convert the machine into a corresponding closed-structure machine, the invention provides for a structure 8 to be placed near the free end of crosspiece 4, which is caused to rest on the said structure by a connector device (the connector assembly is indicated as no. 9), which is fixed to the end of crosspiece 4 and engages a guide located on structure 8.

These parts will now be described in greater detail, by reference to the remaining figures.

Figure 3:
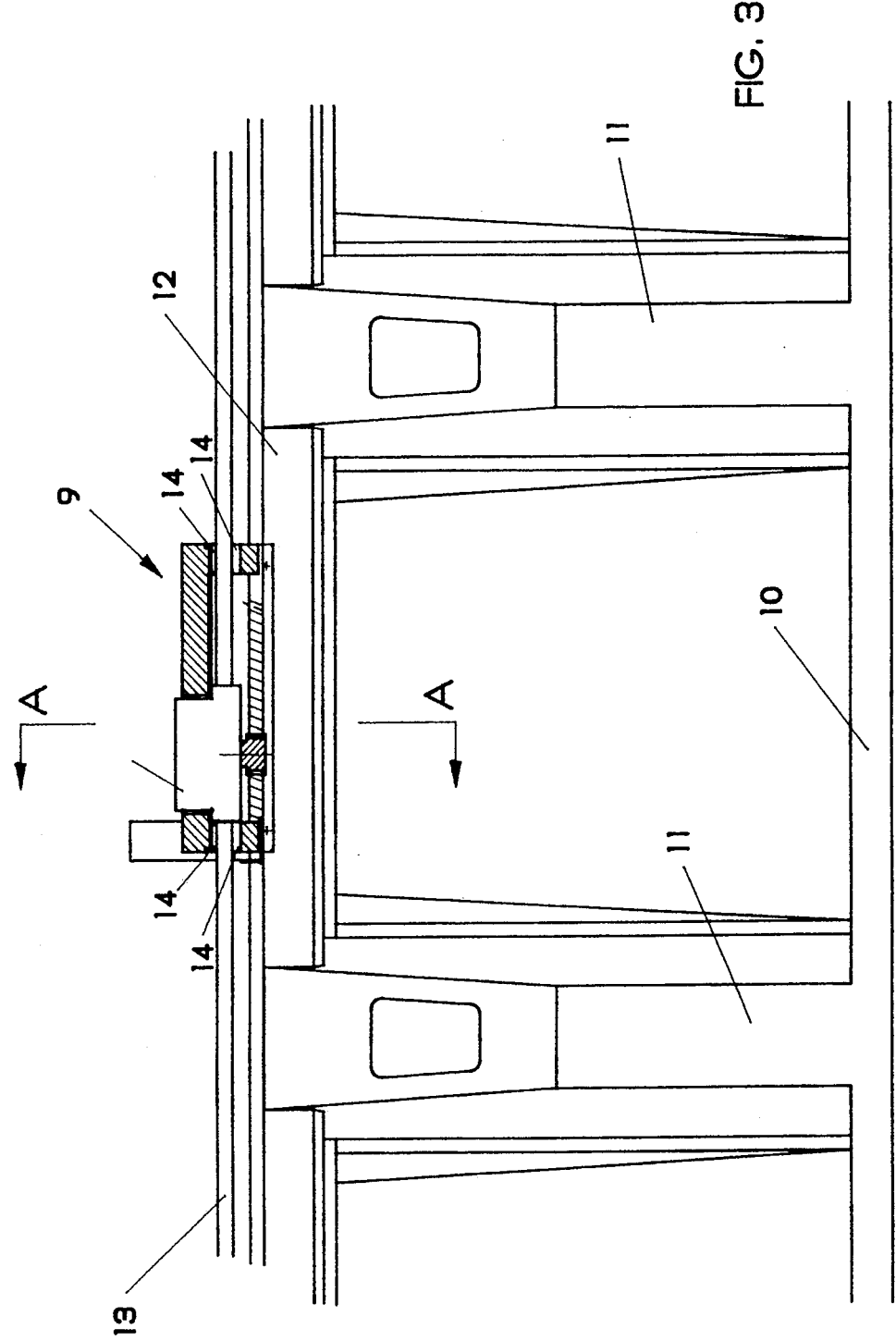
FIG. 3 is the cross-section along line K—K shown in FIG. 2

With reference to FIG. 3, the additional structure comprises a base 10 with a number of uprights 11 and an upper beam 12, which consists of a single piece or is pre-assembled to make a monolithic structure into which the guides along which connector 9 runs are subsequently cut.

In accordance with the state of the art relating to the manufacture of supports and crosspiece guides, when the foundation has been prepared the pillars which will support the runway of the machine are installed, initial levelling is performed, the track or guide is laid, its linearity is checked, and all the necessary adjustments are then made to produce a perfectly straight, horizontal route.

All these operations are complicated, however, and take a great deal of time to perform. If, on the other hand, the various parts making up the structure are pre-assembled, and the precision machining required to cut the machine i guides into the upper beam is performed in the workshop when assembly has been completed, many of the operations described above can be eliminated, and the structure can be easily installed after preparation of the necessary foundation.

Figure 4:
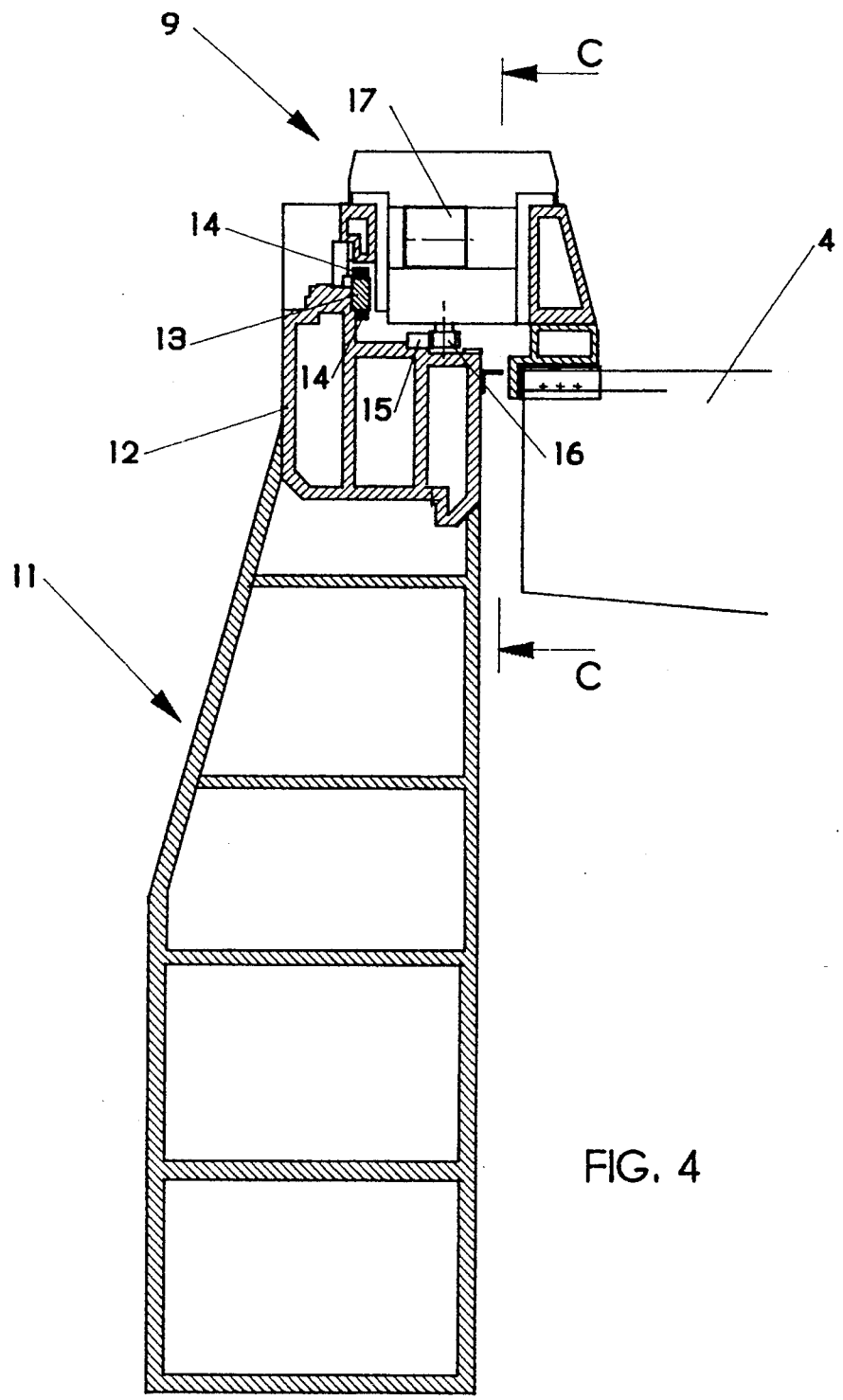
FIG. 4 is the cross-section along line A—A shown in FIG. 3

Beam 12 might, for example, be a box girder as shown in the cross-section in FIG. 4, to which is fixed a guide 13 along which runs a pair of sliding shoes fitted to connector 9, which in turn is fixed (e.g. bolted) to the end of crosspiece 4.

If a single-motor machine is sufficient, connector 9 will only comprise sliding shoes 14 which run along guide 13. If a twin-motor machine is required, connector 9 will also contain the motor with its drive equipment.

In accordance with a preferred version of the invention, a rack 15, which is engaged by a pinion 16 driven by a motor 17 (FIG. 5) via a gear motor, will also be fitted to beam 12.

Both the motor 17 and the gear motor are located on connector 9, which is fixed to the end of the crosspiece.

Figure 7:
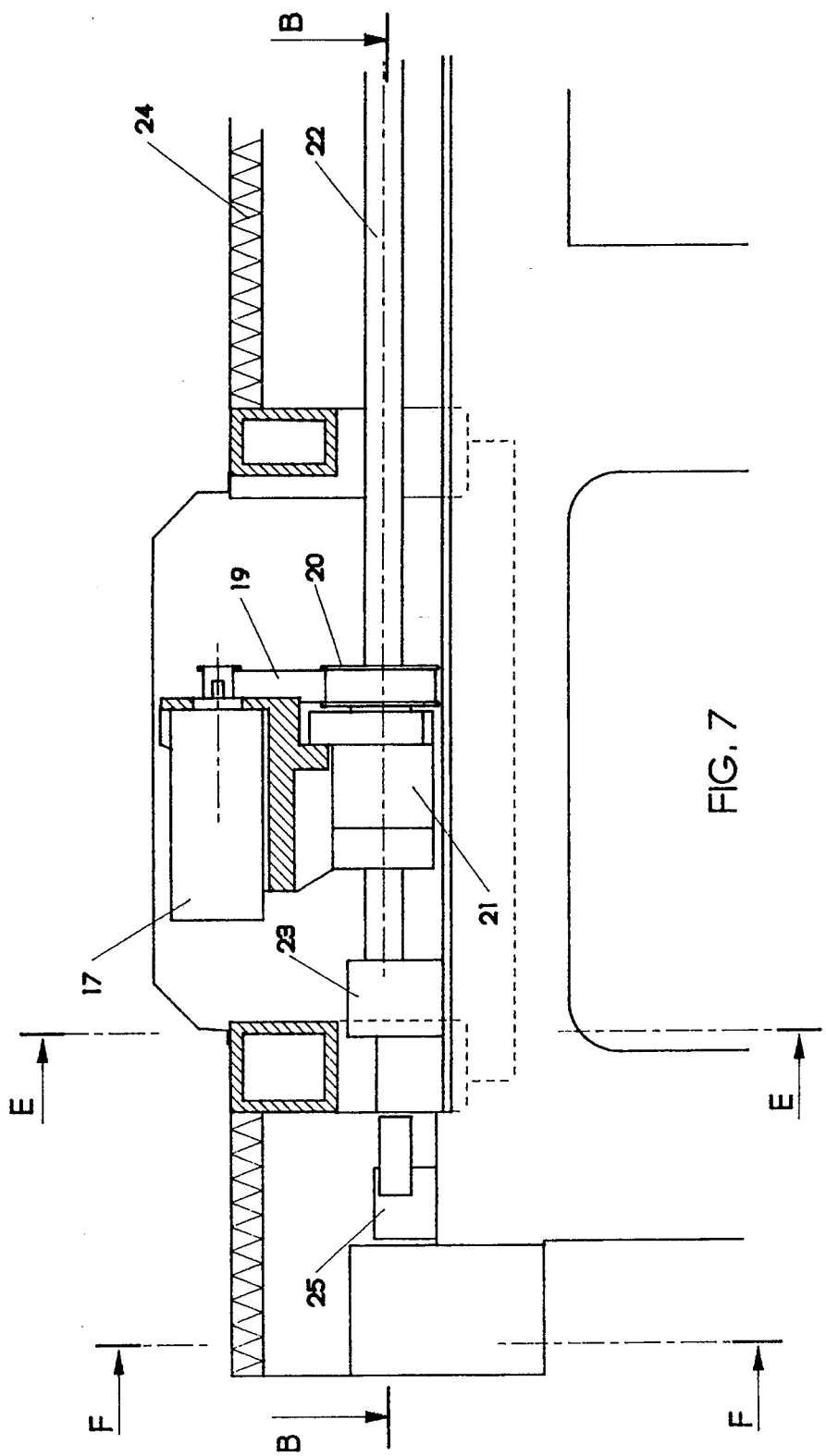
FIG. 7 is a view of the connector fitted to the crosspiece to connect it to the additional structure in correspondence with cross-section D—D in FIG. 5
Figure 8:
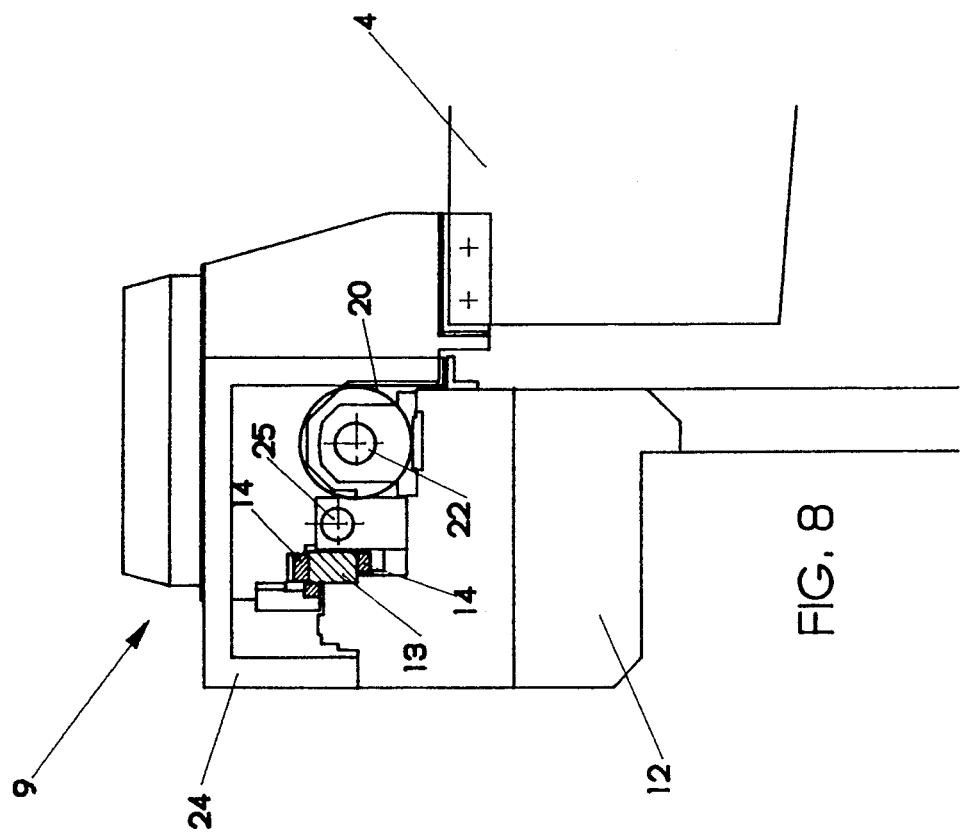
FIGS. 8 and 9 are cross-sections along lines E—E and F—F shown in FIG. 7 respectively.
Figure 9:
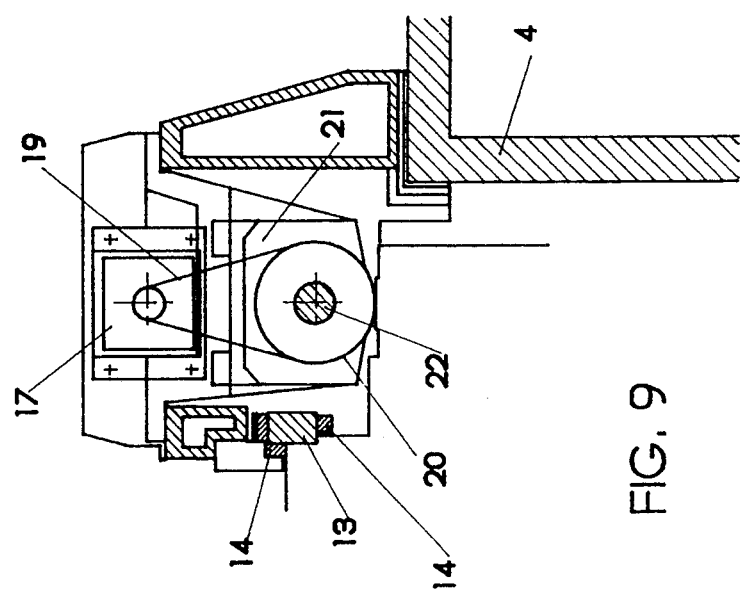

In accordance with a further preferred version of the invention illustrated in FIGS. 6 to 8, the motion of motor 17 will be transmitted via a belt 19 and a pulley 20 to a volute 21, which moves along a recirculating-ball screw 22 fitted on supports 23 which are fixed to beam 12.

Lines 24 indicate a bellows fixed to connector 9 to protect the parts fitted to the beam.

No. 25 indicates a limit buffer for connector 9.

Again with reference to FIG. 1, upright 3 contains a space marked 30 designed to house a set of counterweights 32, which serve to balance the projecting parts, and in particular the weight of the crosspiece and sleeve.

In order to achieve this purpose, the motor of the mobile part of the machine is located in the base of the upright (where it is schematically illustrated and marked 31) in order to free space 30.

This system minimises elastic deformation of the structure.

As will be clear from the description given, the machine in accordance with the invention offers numerous advantages, for the first time making it possible to manufacture a machine which can be converted from an open-structure to a closed-structure configuration.

In particular, the fact that the additional structure is made in a single piece into which the crosspiece guides are subsequently cut, following which it is easily assembled by positioning it on the purpose-built base, offers many advantages over a possible alternative design whereby an extra supporting structure made in the conventional way is added; the latter system would involve measuring the height of the uprights, inserting shims, checking that the track is perfectly linear and horizontal after assembly, and performing the necessary regulations to compensate for any discrepancies found.

The connector between the crosspiece and the additional structure, which can be fitted with an independent motor as well as the sliding shoes which rest it on the structure, makes the machine highly versatile, as it can be converted from an open-structure machine to a closed-structure machine with a single motor or a closed-structure machine with a twin motor.

An expert in the field could also devise numerous modifications and variations, all i of which should be deemed to fall within the scope of this invention.

I claim:

1. Automatic machine tool comprising a base (1), a track (2) extending parallel to a first axis (X), an upright (3) mounted for movement along the track in the direction of the first axis, a crosspiece (4) integral to the upright and projecting outwardly from the upright parallel to a second axis (Y) which is orthogonal to the first axis, the crosspiece having a free end spaced away from the upright, a support (5) mounted for movement on the projecting crosspiece and parallel to the second axis, a sleeve (6) mounted for movement to the support, along a third axis (X) which is orthogonal to the first and second axis, the free end of the crosspiece and the base defining an open side for the automatic machine tool, an additional structure (8) extending across the open side, and a connector system (9) mounted for sliding along the additional structure and connected to the free end of the crosspiece so that the automatic machine tool with the open side becomes a Gantry machine.

2. Automatic machine tool in accordance with claim 1, in which said additional structure (8) is a lattice structure.

3. Automatic machine tool in accordance with claim 1, wherein said additional structure ( 8 ) is a pre-assembled monolithic structure.

4. Automatic machine tool in accordance with claim 1, wherein the said connector (9) contains numerical-control motor equipment designed to move said connector along the said additional structure (8).

5. Automatic machine tool in accordance with claim 4, in which said motor equipment consists of a motor which drives a recirculating-ball actuator.

6. Automatic machine tool in accordance with claim 4, in which said motor equipment consists of a motor which, via a gear motor, drives a pinion which engages a rack fixed to the said additional structure.

7. Automatic machine tool in accordance with claim 1, wherein said additional structure has an upper beam which contains guides (13) along which said connector (9) runs.

8. Automatic machine tool in accordance with claim 1, wherein the upright (3) contains a housing (30) in which counterweights are placed to balance the weight of the crosspiece, in order to limit deformation of the crosspiece.

* * * * *